(12) United States Patent
Schneider

(10) Patent No.: US 8,359,759 B2
(45) Date of Patent: Jan. 29, 2013

(54) SCALE COUPLING SYSTEM

(76) Inventor: James C. Schneider, Olmsted Falls, OH (US)

( * ) Notice: Subject to any disclaimer, the term of this patent is extended or adjusted under 35 U.S.C. 154(b) by 491 days.

(21) Appl. No.: 12/574,592

(22) Filed: Oct. 6, 2009

(65) Prior Publication Data

US 2011/0078913 A1 Apr. 7, 2011

(51) Int. Cl.
*B43L 7/27* (2006.01)
(52) U.S. Cl. ............... 33/484; 33/483; 33/490; 403/100
(58) Field of Classification Search .............. 33/1 D, 33/483, 484, 490, 491, 495–500, 474, 478, 33/758–760, 768, 770, 464, 613, 645, 476; 403/100–104, 109.1, 109.2, 110, 231, 83, 403/84; 446/122
See application file for complete search history.

(56) References Cited

U.S. PATENT DOCUMENTS

| | | | | |
|---|---|---|---|---|
| 653,229 | A * | 7/1900 | Gamble | 33/485 |
| 727,884 | A * | 5/1903 | Bircher | 33/486 |
| 872,964 | A * | 12/1907 | Ostlund et al. | 33/490 |
| 892,780 | A * | 7/1908 | Vaughn | 33/485 |
| 894,498 | A * | 7/1908 | Hills | 33/428 |
| 1,262,038 | A * | 4/1918 | Gould | 33/458 |
| 1,982,178 | A * | 11/1934 | Barnet | 33/451 |
| 2,394,983 | A | 2/1946 | Clarkson et al. | |
| 2,429,871 | A * | 10/1947 | De Masters | 403/4 |
| 2,437,847 | A * | 3/1948 | Zeise | 408/241 B |
| 2,508,252 | A * | 5/1950 | Haack | 33/478 |
| 2,652,866 | A * | 9/1953 | Drain | 144/144.51 |
| 3,386,590 | A * | 6/1968 | Gretz | 211/189 |
| 3,514,863 | A * | 6/1970 | Moll | 33/764 |
| 3,812,587 | A * | 5/1974 | Elkins et al. | 33/764 |
| 4,348,129 | A * | 9/1982 | Conforti | 403/218 |
| 4,702,012 | A * | 10/1987 | Miller | 33/464 |
| 4,864,734 | A | 9/1989 | Woodard et al. | |
| 5,121,526 | A * | 6/1992 | Burkard et al. | 24/336 |
| 5,131,164 | A * | 7/1992 | Miller | 33/613 |
| 5,176,348 | A * | 1/1993 | Gale | 248/220.22 |
| 5,208,992 | A | 5/1993 | Syken et al. | |
| 5,282,767 | A * | 2/1994 | Gelardi | 446/126 |

(Continued)

OTHER PUBLICATIONS

Website Crime Sciences Inc., http://www.crimesciences.com/StoreBox/rulers.htm, Sep. 1, 2009, 3 pgs.
Website Crime Sciences Inc. http://www.crimesciences.com/StoreBox/photomacrographicf/cs-0243-bk.htm, Sep. 1, 2009, 1 pg.
Website Crime Sciences, Inc. http://www.crimesciences.com/StoreBox/rulers/cs-0055.htm, Sep. 1, 2009, 1 pg.

(Continued)

*Primary Examiner* — Peter Macchiarolo
*Assistant Examiner* — Tania Courson
(74) *Attorney, Agent, or Firm* — D.A. Stauffer Patent Services LLC

(57) ABSTRACT

A collection of couplers and a corresponding coupling method that removably connect existing forensic scales to create a coupled scale, wherein a ruler arm of each scale is slidingly engaged in a track of the coupler that provides and maintains arm-to-arm angular accuracy for scales coupled in a fixed angle, co-planar joint, and measurement accuracy of scale markings across the joint. The track includes a lower surface; two laterally opposed parallel edge walls extending up from the lower surface and spaced apart by a dimension suitable for slidingly engaging a ruler arm width; holding tabs that extend laterally inward from both edge walls spaced above the lower surface by a dimension suitable for slidingly engaging a ruler arm thickness; an open end; and preferably a longitudinally distal registration stop. Two coupler tracks are joined with co-planar lower surfaces; and an edge wall of each joined at a fixed angle vertex.

14 Claims, 4 Drawing Sheets

U.S. PATENT DOCUMENTS

| | | | |
|---|---|---|---|
| 5,353,509 | A | 10/1994 | Black et al. |
| 5,392,525 | A | 2/1995 | Chow et al. |
| 5,440,818 | A | 8/1995 | Mailhot et al. |
| 5,803,782 | A * | 9/1998 | Selton .......................... 446/126 |
| 5,881,468 | A * | 3/1999 | Baumann ........................ 33/383 |
| 6,033,282 | A | 3/2000 | Lin et al. |
| 6,141,882 | A | 11/2000 | Syken et al. |
| 6,247,240 | B1 | 6/2001 | Economaki et al. |
| 6,442,856 | B1 | 9/2002 | Warner et al. |
| 6,467,179 | B1 * | 10/2002 | Wolf .............................. 33/474 |
| 6,851,196 | B1 | 2/2005 | Fry Leever et al. |
| 6,880,261 | B1 * | 4/2005 | Abbey ........................... 33/759 |
| 6,880,277 | B2 | 4/2005 | Kaminski et al. |
| 6,931,735 | B1 * | 8/2005 | Clark et al. ..................... 33/194 |
| 7,082,692 | B2 | 8/2006 | Shapiro et al. |
| 7,748,128 | B2 * | 7/2010 | Martin ........................... 33/374 |
| 7,877,889 | B2 * | 2/2011 | Griffin, Jr. ...................... 33/562 |

OTHER PUBLICATIONS

Website Evident Crime Scene Products http://www.evidentcrimescene.com/cata/photo/photo.html, Sep. 1, 2009, 8 pages.

Website Lightening Powder, Inc. http://shop.armorforensics.com/mm5/merchant.mvc?Screen=PROD&Store_Code=RedWop&Product_Code=..., Sep. 1, 2009, 1 Page.

Website Lightening Powder, Inc. http://shop.armorforensics.com/mm5/merchant.mvc?Screen=PROD&Store_Code=RedWop&Product_Code=., Sep. 1, 2009, 1 page.

Website Lightning Powder, Inc. http://shop.armorforensics.com/mm5/merchant.mvc?Screen=CTGY_P&Store_Code=RedWop&Category_Co..., Sep. 1, 2009, 2 pages.

* cited by examiner

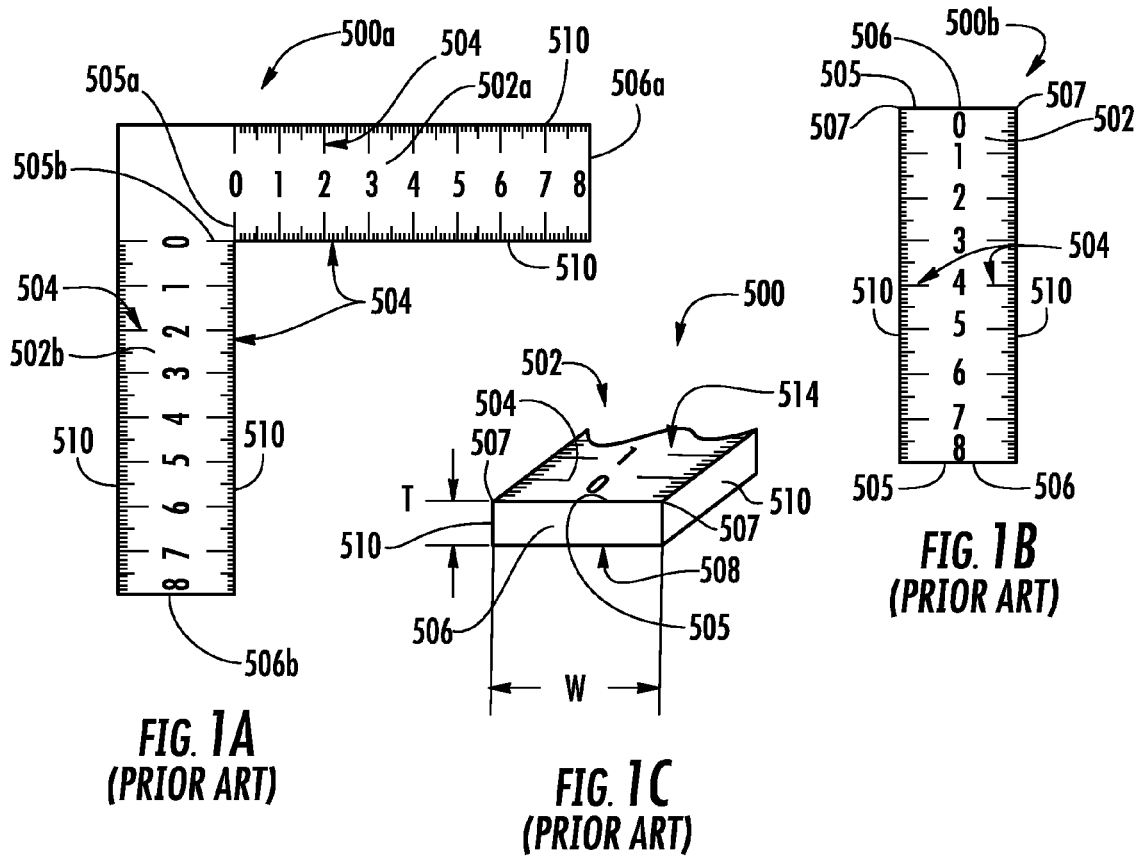
FIG. 1A
(PRIOR ART)
FIG. 1B
(PRIOR ART)
FIG. 1C
(PRIOR ART)
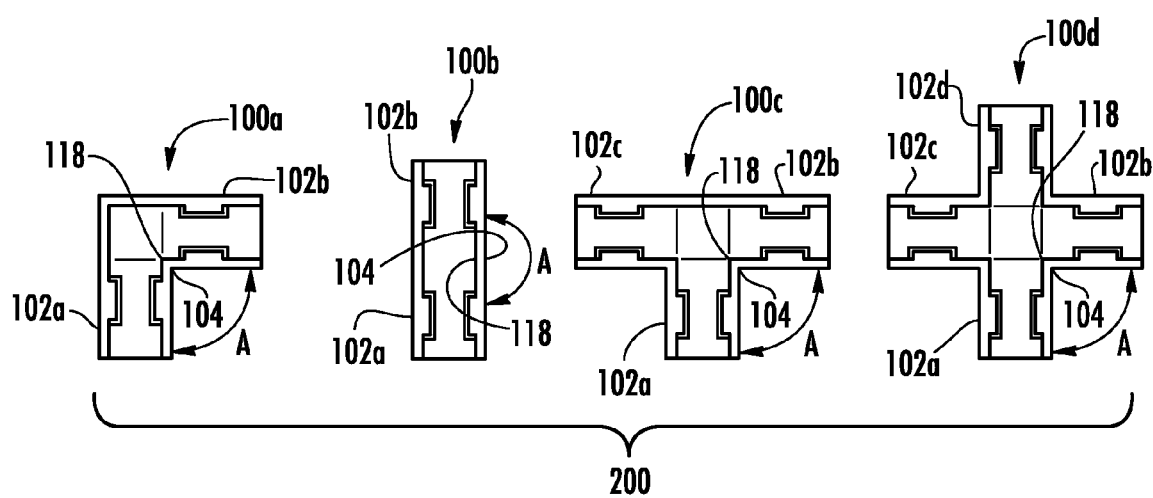
FIG. 2

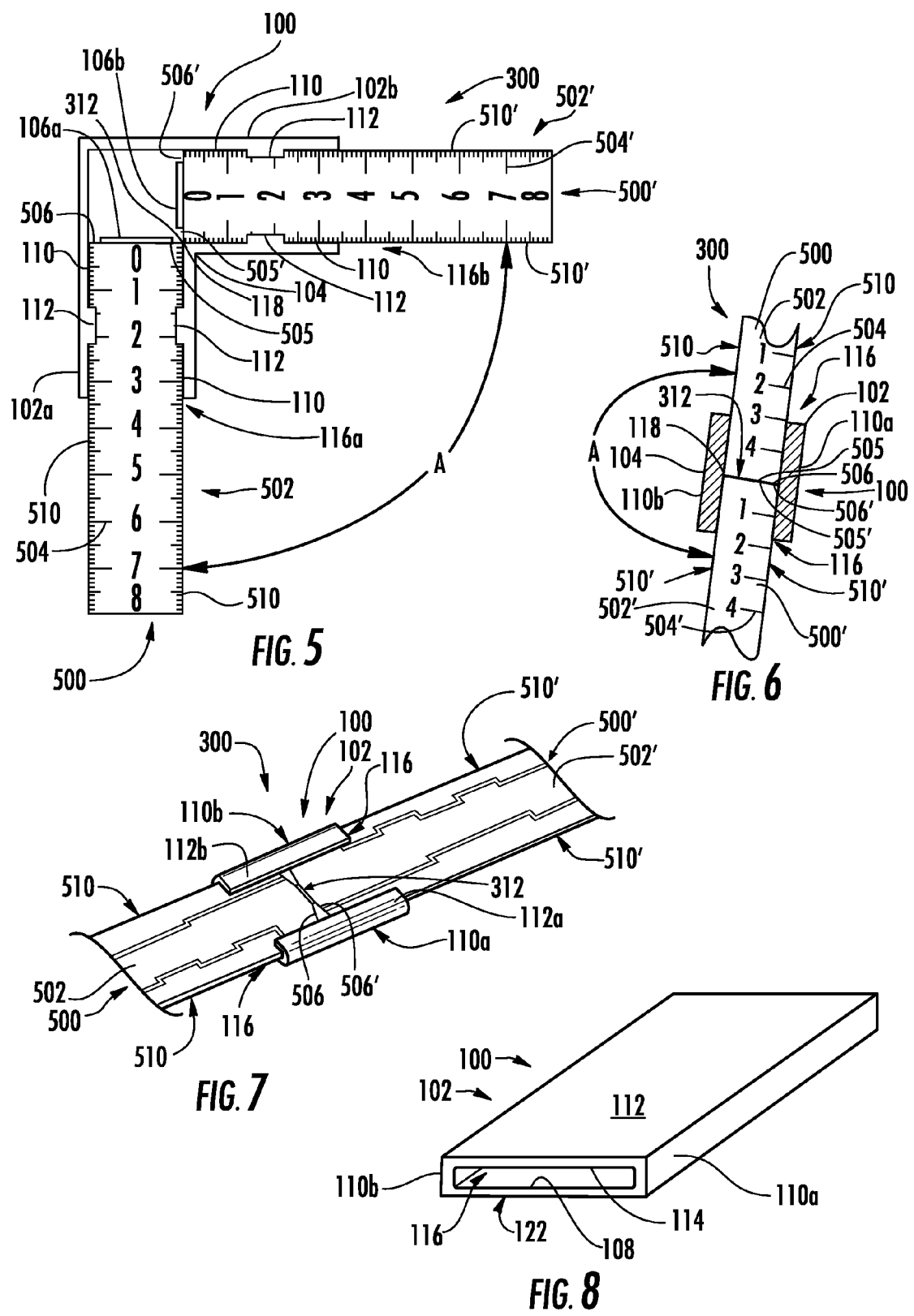

SCALE COUPLING SYSTEM

TECHNICAL FIELD OF THE INVENTION

The present invention relates to geometrical instruments having plural straightedges with linear distance scale markings thereupon and, more particularly to means for coupling said plural straightedges.

BACKGROUND OF THE INVENTION

In conducting an investigation of a crime, forensic personnel use various visual markers to measure and document identifying characteristics of physical evidence. Such markers are typically positioned next to an item of evidence and then photographed to provide a documentary record of the evidence (memorializing). These photographed markers can then be used in trial to show visual indicia on them that permit characterization of the item of evidence, such as height and width.

Photographic documentation of crime and accident scenes, medical conditions and the like typically include one or more straightedged forensic scale(s) within the photographic view in order to establish scale and orientation so that accurate measurements of size, shape, and relative position may be later determined by analysis of the photograph. Coroners and other forensic personnel such as medical and dental doctors and the like typically want to document irregularly shaped individual, and/or a pattern of multiple, wounds or stains on a body surface, and presently use one or more straightedge or right angle scales laid on the body around the area of interest. The specialized field of forensic scales is dominated by a few suppliers who provide a limited line of products that vary mainly in color (e.g., black, white) and types of scale markings (e.g., front face only, both front and back, metric, English, etc.). The overall scale dimensions are effectively standardized to a few common lengths, widths and thicknesses.

A typical example of how forensic scales are used by forensic personnel ("users") is as follows:
 1. An area of crime evidence, such as a wound, blood stain, birthmark, etc. (typically on a body) is being documented.
 2. A forensic scale, preferably a right angle scale, is placed so that the wound (for example) is near the inside corner of the scale.
 3. A photo is taken of the wound with the scale also in view. This allows detailed measurements to be accurately made on the photograph, even if magnified for closer examination.
 4. The photograph may be taken under ultraviolet lighting because body fluids like blood and semen fluoresce, making them more visible.
 5. If there are several wounds in a large pattern, a larger scale may be needed.

Unfortunately, the evidence area is often too large for the range of scale sizes that the user has available. In that case, two or more scales are typically placed around the area. For the best accuracy in measurement, the scales should be placed either end to end to form a continuously linear straightedge with scale markings spaced correctly across the junction; or at right angles, where the scale markings share a common zero point at the inside vertex, and the straight edges are exactly ninety degrees apart.

Obviously, it is difficult to achieve perfect alignment, spacing, and angles, especially if laid out on the irregular contours of a person's body. The work-around in use now is to utilize a computer to manipulate the photographic image as needed to create an accurate grid of measurement intervals, but then that may cause questions about validity of the evidence.

U.S. Pat. No. 6,880,277 (Kaminski; 2005) discloses a plural-part evidence marker comprising at least two flat marker elements (20) bearing visual indicia thereon, and a substantially rigid leg unit (30) connecting and detachably securing the at least two flat marker elements at an angle (preferably ninety degrees) with respect to one another. The leg unit consists of six identical, orthogonally disposed legs (32) substantially shorter than the pair of edges (22) of the flat marker elements. Each of the six legs of the leg unit preferably has four orthogonal grooves (34) formed longitudinally therein. Each groove is capable of receiving an edge of one of the flat marker elements therein, retaining one of the flat marker elements therein by friction.

It can be seen that Kaminski's evidence marker does not provide a common scale marking zero point to align two or more scales to accurately measure evidence, therefore this requires forensic personnel to calculate the distance between two scales connected according to Kaminski's disclosure. Furthermore, the separation distance and relative angle between Kaminski's connected scales can change because the leg unit frictionally holds the scales on only one edge, which allows the scales to be inadvertently moved out of relative position while in use. There is also a vertical leg that interferes with use in a planar configuration.

U.S. Pat. No. 2,394,983 (Clarkson; 1944) discloses a scale assembly comprising an adapter (11) for assembling and holding a pair of companion scales or ruler-equipped scales at right angles to each other. A regular triangular ruler (5) equipped with a suitably graduated scale (6); and a conventional flat-type double beveled ruler or scale (8) equipped with a scale (10) are used, wherein one end of the flat ruler (8) is mitered (9) and thus suitably beveled to conformably associate its graduated scale (10) with the graduated scale (6) of the triangular ruler (5).

It can be seen that Clarkson's scale assembly, while using existing scales, requires modification (mitering) of at least one scale/ruler in order to enable right angle positioning plus alignment of scale markings of two scales when they are assembled using Clarkson's adapter. Clarkson's scale assembly also relies on a flat surface to hold the assembled scales at a fixed right angle.

The prior art discloses other ways to connect scales at fixed relative angles while also aligning their scale markings, but in general they require specially formed or modified scales. In other words, the prior art typically works with custom scales, not pre-existing ones. Examples of this prior art include U.S. Pat. Nos. 5,208,992, 5,353,509, 5,392,525, 5,440,818, 6,033, 282, 6,141,882, 6,247,240, 6,851,196, and 7,082,692.

Thus there is an unmet need in the market for a means of combining existing, unmodified scales to create arbitrary larger, optionally multi-armed scales for use by crime investigators, particularly forensic personnel, in varied measuring situations. Therefore, it is an object of the present invention to provide a scale coupling system that works with existing, unmodified scales to form a coupled scale with at least two forensic scales being coupled at a scale joint wherein the coupling means maintains measurement accuracy of scale markings across the scale joint, and assures angular accuracy of a fixed angle scale joint including linearity along one hundred eighty degree joined scale arms.

BRIEF SUMMARY OF THE INVENTION

A collection of couplers and a corresponding coupling method that removably connect existing forensic scales to create a coupled scale, wherein a ruler arm of each scale is slidingly engaged in a track of the coupler that provides and maintains arm-to-arm angular accuracy for scales coupled in a fixed angle, co-planar joint, and measurement accuracy of scale markings across the joint. The track includes a lower surface; two laterally opposed parallel edge walls extending up from the lower surface and spaced apart by a dimension suitable for slidingly engaging a ruler arm width; tabs that extend laterally inward from both edge walls spaced above the lower surface by a dimension suitable for slidingly engaging a ruler arm thickness; an open end; and preferably a longitudinally distal registration stop. First and second tracks are joined such that their lower surfaces are co-planar; and at least one of their edge walls is joined at a vertex that defines a fixed angle. Thus, by using the inventive coupling system, a user is able to assemble a custom coupled scale comprising any desired planar configuration of ruler arms as needed to accurately photo-document exact dimensions and relative locations of evidence that is scattered over a larger and/or more oddly shaped area than can be covered by a single standard scale.

According to the invention, a coupler is disclosed for removably coupling together unmodified forensic scales to form a coupled scale with two scales being coupled at a scale joint defining a fixed angle A about a vertex therebetween, such that the coupler holds the coupled scales in a way that maintains arm-to-arm angular accuracy for ruler arms of the scales coupled in the fixed angle scale joint including linearity along one hundred eighty degree joined ruler arms; wherein a plurality of forensic scales having standardized dimensions are provided by a user of the coupler, wherein each forensic scale has at least one straightedged ruler arm ruled for measurement with a series of scale markings extending longitudinally at regular measurement intervals; the coupler comprising:

a longitudinally extending first track having: a lower surface; two laterally opposed parallel edge walls extending up from the lower surface and spaced apart by a track width W' suitable for slidingly engaging a first ruler arm's width W; an open end; and holding tabs that extend laterally inward from both edge walls to define an upper surface spaced above the lower surface by a track height T' suitable for slidingly engaging the first ruler arm's thickness T;
 a longitudinally extending second track having: a lower surface; two laterally opposed parallel edge walls extending up from the lower surface and spaced apart by a track width W' suitable for slidingly engaging a second ruler arm's width W; an open end; and holding tabs that extend laterally inward from both edge walls to define an upper surface spaced above the lower surface by a track height T' suitable for slidingly engaging the second ruler arm's thickness T; and
 a fixed angle junction where the first track and the second track are joined such that:
 the lower surfaces of the first and second tracks are co-planar; the upper surfaces of the first and second tracks are co-planar; and a first edge wall of the first track is joined to a first edge wall of the second track to form a vertex of the fixed angle A.

Further according to the invention: the fixed angle A is one hundred eighty degrees to form a straight coupler with co-linear first and second tracks such that, when the scale ruler arms are suitably slidingly engaged, the scale joint is defined by a line of contact along which the first ruler arm end abuts against the second ruler arm end; thereby providing the user with a linearly aligned coupled scale of extended scale arm length.

Preferably the first and second scale ruler arms are selected for having a square ruler arm end with an end mark one of the scale markings that is positioned precisely at the edge of the square ruler arm end; thereby providing the user with a linearly aligned coupled scale of extended scale arm length wherein the regular measurement intervals of the scale markings continue across the scale joint. Further preferably the coupler is extruded such that the first and second tracks are a single continuous track. Optionally the holding tabs extend all the way from the first edge wall to the second edge wall and merge to form a continuous planar upper surface.

Further according to the invention the fixed angle A is ninety degrees such that, when the first and second scale ruler arms are suitably slidingly engaged with respective first and second tracks, the scale joint is defined by the locus of a corner point of the first ruler arm end touching a corner point of the second ruler arm end at the fixed angle junction of the coupler, thereby forming the vertex of the fixed angle A.

Preferably the inventive coupler further comprises a registration stop being a vertical wall extending up from the lower surface of the track thereby defining a track inner end that is distal to the open end of the track; wherein the registration stop wall at the inner end of a first one of the tracks is aligned with the first edge wall of a second one of the tracks; thereby positioning the end of a suitably slidingly engaged ruler arm at the vertex of the fixed angle A. Further preferably the first and second scale ruler arms are selected for having a square ruler arm end with an end mark one of the scale markings that is positioned precisely at the edge of the square ruler arm end; thereby assuring accurate registration of end marks at the vertex of the coupled scale, and therefore maintaining measurement accuracy of scale markings across the scale joint.

Further according to the invention, two, three, or four tracks are joined at ninety degree fixed angle junctions to form one, two, or four right angle vertices, respectively; on a corner coupler, a tee coupler, or a cross coupler, respectively; such that: the lower surfaces of all of the tracks are co-planar; the upper surfaces of all of the tracks are co-planar; and for each pair of first and second tracks that form a junction at a corresponding ninety degree fixed angle junction, the first edge wall of the first track is joined to the first edge wall of the second track at the corresponding fixed angle junction.

According to an embodiment of the invention, the coupler further comprises cutouts passing through the lower surface of the tracks, a one of the cutouts being located vertically below each one of the holding tabs such that each cutout has an open area that encompasses the entire track upper surface defined by the respective holding tab; thereby simplifying coupler manufacturing.

According to an embodiment of the invention, a plurality of couplers are provided as a scale coupling system. Preferably the scale coupling system comprises: a combination of two or more couplers selected from the group consisting of straight couplers, corner couplers, tee couplers, and cross couplers; wherein: a straight coupler has two tracks joined at a fixed angle of one hundred eighty degrees; a corner coupler has two tracks joined at a fixed angle of ninety degrees; a tee coupler has three tracks, two being joined at a fixed angle of ninety degrees to a third track, and also joined at a fixed angle of one hundred eighty degrees to each other; and a cross coupler has four tracks joined at four fixed angles of ninety degrees. Optionally the scale coupling system comprises couplers having different dimensional magnitudes for either or both of their respective track width W' and track height T' dimensions.

According to an embodiment of the invention, the coupler is transparent, at least where it covers the scale markings on a slidingly engaged scale ruler arm.

According to an embodiment of the invention, the coupler further comprises scale marking lines on a surface of the coupler. For example the scale marking lines are on an outside lower surface of the coupler.

According to an embodiment of the invention the scale marking lines: fluoresce under ultraviolet lighting.

According to an embodiment of the invention the scale marking lines: are straight lateral lines extending at least partially across the coupler; and one or more of the scale marking lines have a line width of about 1 mm.

According to the invention, the coupler is part of a coupling system that comprises a method for using the coupler to form the coupled scale with two scales being coupled at a scale joint defining a fixed angle A about a vertex therebetween, such that the coupler holds the coupled scales in a way that maintains arm-to-arm angular accuracy for ruler arms of the scales coupled in the fixed angle scale joint.

According to the invention, a method is disclosed for removably coupling together unmodified forensic scales to form a coupled scale with two of the unmodified scales being coupled at a scale joint defining a fixed angle A about a vertex therebetween, and wherein measurement accuracy of scale markings is maintained across the scale joint, the method comprising the steps of: selecting a first and a second forensic scale, each being suitable for coupling in that each selected scale has an arm with a standardized width W and thickness T, and a series of scale markings extending longitudinally at regular measurement intervals relative to an end mark at a longitudinal end of the arm; providing a coupler that has a first track and a second track that is fixed at the fixed angle A relative to the first track; and wherein the first and second tracks each have lower and upper surfaces spaced apart by a track height T' that closely fits the standardized thickness T, and have side edge walls spaced apart by a track width W' that closely fits the standardized width W; slidingly engaging the first scale's arm in the first track, and slidingly engaging the second scale's arm in the second track; and positioning the slidingly engaged first and second scale arms in the coupler's respective first and second tracks to form a scale joint wherein the first arm's end mark intersects the second arm's end mark at the vertex of the fixed angle A.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but distinct elements may have the same number but are distinguished by primes. For example, 109, 109', and 109" are three different elements which are similar or related in some way, but are distinct due to, for example, significant modifications. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein:

FIGS. 1A and 1B are top views of prior art scales suitable for use with the present invention.

FIG. 1C is a perspective end view of the prior art scales of FIGS. 1A and 1B.

FIG. 2 is a top view of a scale coupling system comprising four exemplary embodiments of couplers, all according to the invention.

Figure 3A:
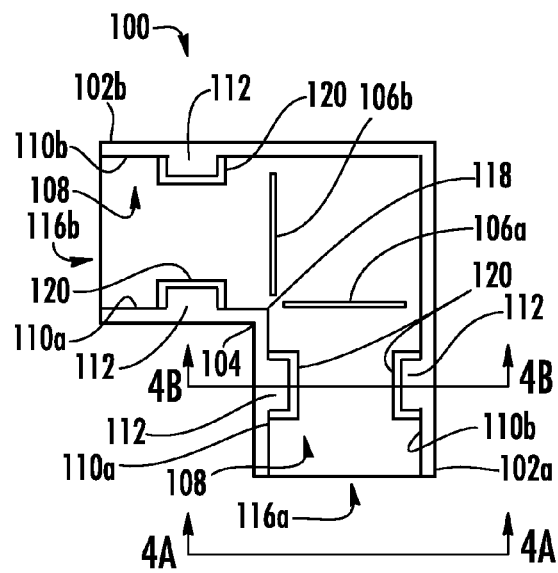
Figure 3B:
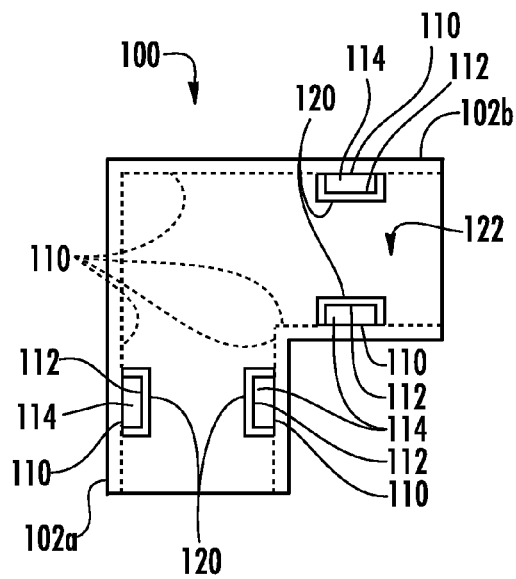

FIGS. 3A and 3B are top and bottom views, respectively, of a corner coupler, according to the invention.

Figure 4A:
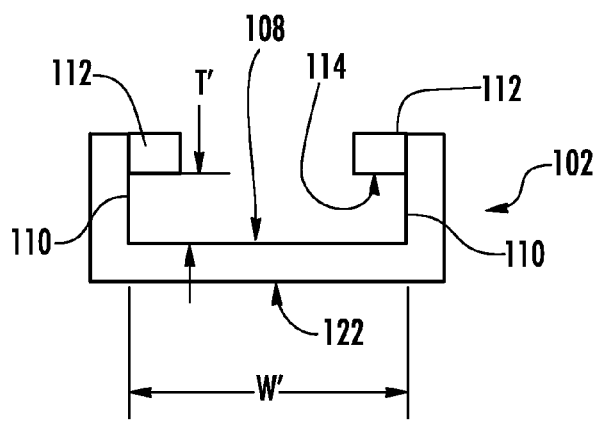

FIG. 4A is a side view of an open end of the coupler of FIG. 3A, the view taken along the line 4A-4A, according to the invention.

Figure 4B:
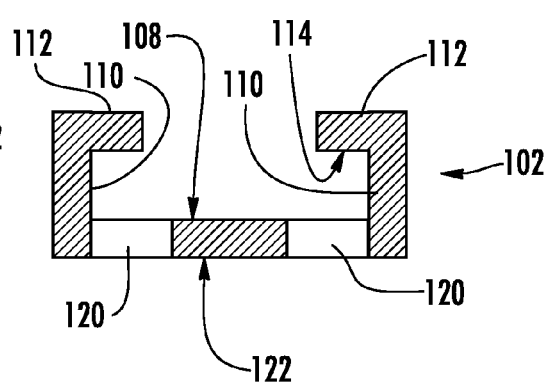

FIG. 4B is a side cross-sectional view of the open end of the coupler of FIG. 3A, the view taken along the line 4B-4B, according to the invention.

FIG. 5 is a top view of the corner coupler of FIG. 3A, illustrating ruler arms of two prior art scales slidingly engaged therein to form a coupled scale, according to the invention.

FIG. 6 is a top view of a horizontal cross-section of a straight coupler illustrating ruler arms of two prior art scales slidingly engaged therein to form a coupled scale, according to the invention.

FIG. 7 is a perspective top view of a straight coupler illustrating ruler arms of two prior art scales slidingly engaged therein to form a coupled scale, according to the invention.

FIG. 8 is a perspective end view of a straight coupler embodiment wherein a top portion extends fully across the coupler, according to the invention.

Figure 9A:
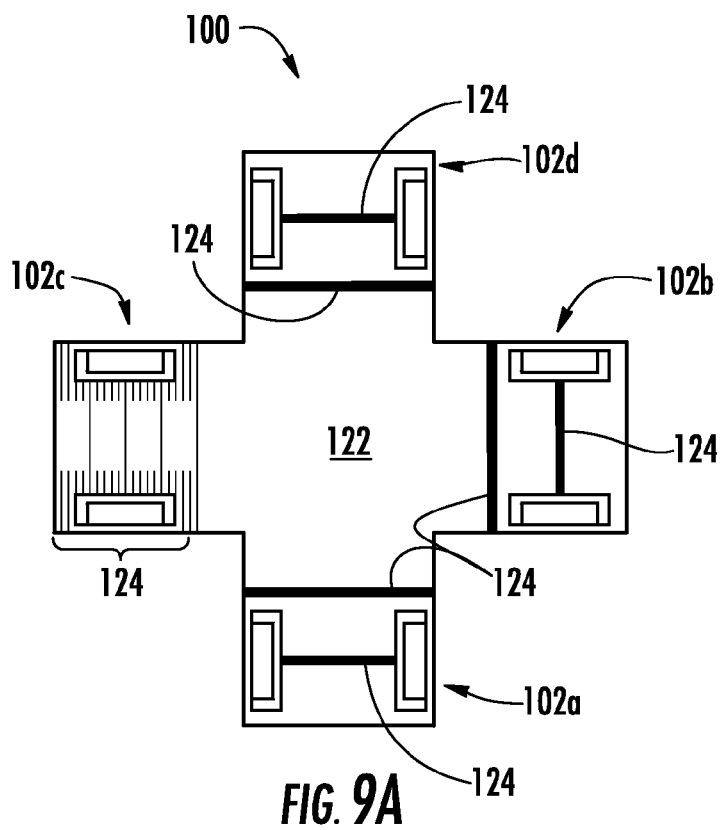
Figure 9B:
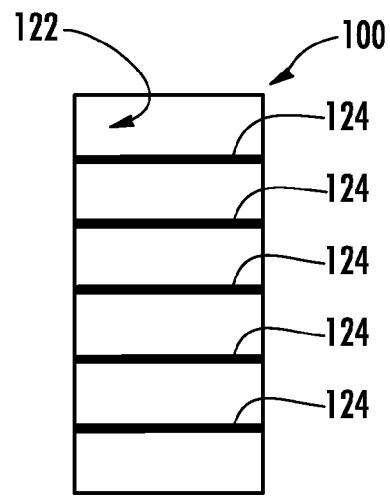

FIGS. 9A and 9B are bottom views of two coupler embodiments illustrating various embodiments of scale marking lines applied thereupon, according to the invention.

DETAILED DESCRIPTION OF THE INVENTION

Some Definitions:

As is evident from reading prior art disclosures, terminology relevant to rulers and scales and measurement devices is presented in a variety of contexts that may blur any formal distinctions between terms such as "ruler" and "scale", for example. This ambiguity is likely due to the fact that most "rulers" in common everyday use have both a straight edge (straightedge) suitable for making ruled (i.e., straight) lines, plus scale markings suitable for using the ruler as a scale to make measurements. Therefore, for clarity of the present disclosure, the following terms are generally defined as follows, however common sense should prevail in case a term is used in a context that obviously indicates an inadvertent alternative use of a term. The basic definitions are derived from a current dictionary.

scale: a sequence of scale markings at measurement intervals, used as a reference in making measurements; also a measuring instrument with such scale markings. In most instances the present disclosure will use the term "scale" to refer to the latter-defined measuring instrument.

scale markings: regularly spaced marks (indices) that form a scale suitable for distance measurements. The scale markings may be numbered according to distance from a zero mark origin.

ruler (also straightedge): a straightedged strip (arm) of preferably rigid material, suitable as a guide for drawing straight lines. Substantially equivalent to a linear type of scale when scale markings are suitably displayed along the length (longitudinal direction) of the ruler. As used herein, a ruler portion of a scale is assumed to have two substantially parallel longitudinally extending straightedges.

ruler arm: a (straightedged) ruler portion of a scale. The scale may have one or more ruler arms, each of which displays scale markings of the scale.

right angle scale: a type of scale that has two ruler arms joined at a fixed right angle.

For the sake of clear and focused description, the present disclosure is primarily discussed and illustrated with exemplary embodiments of a forensic "scale coupling system," i.e., a method for connecting/joining/coupling two or more forensic scales, and a coupling device (coupler) or collection thereof (200 in FIG. 2) for implementing the inventive method. Given the present disclosure, it should be apparent to engineers of ordinary skill how to adapt the disclosed scale coupling system for use with other scales and/or rulers meeting the basic preconditions stated herein, whether or not the other scales/rulers are considered to be "forensic scales." Therefore, any reference herein to a "coupler" should be understood to apply more generally to ruler/scale "connectors" of similar size and/or characteristics unless specifically stated otherwise. Furthermore, it should be apparent that disclosure directed to coupling ruler arms of scales is generally inclusive of coupling ruler arms that do not have scale markings that make them "scales" per se.

The embodiments of the invention that are described herein are particularly suited for use by forensic personnel for documenting measurements of variously sized evidence, wherein scales that suffice for measuring smaller objects, like a bite mark, for example, may need to be combined to create a coupled scale shaped and sized to cover the area of larger features or patterns, such as a series of bite marks, or such as a widespread blood stain, for example. For the best accuracy in measurement, the inventive coupler insures that ruler arms of any two coupled scales are positioned either end to end to form a continuously linear straightedge with scale markings spaced correctly across the junction; or at right angles, where the scale markings share a common zero point at an inside vertex, and the ruler arm straightedges are precisely ninety degrees apart. Thus an important feature of the present invention is a coupler track for each scale to be coupled, wherein a ruler arm of each scale slides into a corresponding track that holds the scale in a desired position relative to the other scale(s) in the coupler.

As noted in the background, in the specialized field of forensic scales overall scale dimensions are effectively standardized to a relatively few common lengths, widths and thicknesses, resulting in what we are calling "standard scales", or more simply, scales 500. The range of standardized dimensions becomes even more limited when we subdivide the market into forensic specialties. For example, coroners analyzing bodies will have a supply of forensic scales that is suitable for use on human bodies, while forensic personnel who typically work at crime scenes will have larger scales suitable for documenting larger patterns and stains and relative placement of multiple bodies. Thus the present invention can be manufactured in a small range of sizes, if not a single size, for each segment of the market among users of forensic scales.

FIGS. 1A-1C illustrate characteristics of exemplary standard (commercially available, prior art) forensic scales (collectively referenced herein as scales 500) that are commonly used at the present. FIG. 1A illustrates a standard right angle scale 500a having a first ruler arm 502a and a second ruler arm 502b. FIG. 1B illustrates a standard straight scale 500b comprising a single ruler arm 502. Referring also to the perspective view of FIG. 1C, ruler arms 502 are defined herein as a portion of a scale 500 comprising a ruler with two substantially parallel longitudinally extending straightedges 510 (linear side edges) and at least one longitudinal end 506 (also instances 506a, 506b) that is preferably a "square end" wherein the face of a square end is substantially planar and perpendicular to the side edges 510. Dimensions for a standard (typical prior art) scale 500 include a ruler arm width W measured orthogonally (laterally) between the two opposed side edges 510, and a ruler arm thickness T measured between a top face 514 and a bottom face 508 of the ruler arm 502. For example, a commonly used forensic scale has a thickness T of about 1 mm (millimeter) and a width W of about 25 mm. Generally the standard scales 500 have a single-valued thickness T and a single-valued width W throughout the entire area of the scale 500. Nevertheless it will be seen that the present invention is generally able to accommodate many potential variations such as, but not limited to, a laterally bowed ruler arm 502, and a non-uniform thickness T (e.g., raised lettering, ridges).

Since they are part of a (measuring) scale 500, the ruler arms 502 are generally ruled with a series of measurement scale markings (marks, indices) 504 extending longitudinally at regular measurement intervals in suitable distance units (typically in centimeters and/or inches, with subdivisions at millimeter or fractional inch increments) thereby enabling accurate distance measurements along the ruler arm. Although numbering isn't needed by users who know the measurement units, typically distance numbers are periodically printed near corresponding scale marks 504. For best measurements using scales 500 that are coupled according to the present invention, it is advantageous to have one of the scale markings 504 be an "end mark 505" that is positioned precisely at the edge of a longitudinal end 506 of at least one of the scale's ruler arms 502, and preferably that end 506 is a square end, as shown in FIGS. 1A-1C. As will be seen in the description hereinbelow, if the scale markings 504 are numbered, then it is helpful in some scale coupling situations to have the end mark 505 be labeled as a zero mark.

FIG. 1C shows a perspective view of a ruler arm 502 of a scale 500. The ruler arm 502 comprises a longitudinal end 506 (showing the width W and thickness T), a bottom face 508, a top face 514 and two side edges (straightedges) 510. Scale markings 504 are shown on the top face 514, but may be present on the bottom face 508 as well. A corner point 507 is where the top face 514 and end 506 meet a side edge 510. As illustrated, the end 506 is a "straight end" which advantageously positions the two corner points 507 precisely at the edge of the longitudinal end 506, and at laterally opposed ends of an end mark 505 that can be positioned there.

FIG. 1B shows a straight (linear) scale 500b comprising a single ruler arm 502 with two longitudinal ends 506 (shown as square ends). Scale markings 504 are ruled along both side edges 510. The scale marking 504 at the top one of the ends 506 is an end marking 505 having a printed label of "0" (zero) such that it becomes a "zero mark" as well. Preferably the scale marking 504 at the bottom one of the ends 506 is also an end marking 505, thereby making the illustrated straight scale 500b an ideal scale 500 for the broadest potential use with the inventive coupling system 200. Corner points 507 are indicated at the top one of the ruler arm ends 506.

FIG. 1A shows a right angle scale 500a having a first ruler arm 502a and a second ruler arm 502b, each having one longitudinal end 506a, and 506b, respectively. Each of the ruler arms 502a, 502b has scale markings 504 ruled along both edges 510. Importantly for making accurate measurements in two dimensions, a zero/end marking 505a of the first ruler arm 502a is precisely positioned for alignment with a precisely positioned zero/end marking 505b of the second ruler arm 502b such that the zero markings 505a and 505b are registered to meet (intersect) at the physical inside corner point (vertex, not numbered) of the first and second ruler arms 502a and 502b, respectively. It is understood, of course, that for the "right angle" scale 500a, the first ruler arm 502a is physically and permanently joined with the second ruler arm 502b at a fixed angle of exactly ninety degrees.

It is an object of the present invention to removably couple two or more ruler arms 502 of prior art scales 500 (e.g., right angle scales 500a, straight scales 500b) to form a temporary "coupled scale 300" that exhibits as many as possible of the useful characteristics of the prior art scales 500. It should be apparent that any ruler arm 502 that meets the above description of a suitable ruler arm 502 can be coupled according to the present invention, regardless of whether the ruler arm 502 is part of a straight scale (e.g., 500b) or a multi-armed scale (e.g., a right angle scale 500a). It is noted that said description includes a longitudinal end 506 for the ruler arm 502, that end 506 being free-standing, preferably square, and preferably having a coincident scale marking 504 that qualifies as an end mark 505. The two ruler arm ends 506a and 506b shown in FIG. 1A are illustrated with square ends and eight centimeter end marks (reference number 505 not shown).

FIG. 2 shows an embodiment of the scale coupling system 200 that comprises, for example, a corner coupler 100a, a straight coupler 100b, a tee coupler 100c, and a cross coupler 100d; all being couplers 100 according to the present invention. The inventive scale coupling system 200 is a coupling method that is embodied in inventive couplers 100, which can take various forms according to quantity and relative positioning of elements of the coupler 100, and a collection (set, kit) of any quantity of any coupler 100 variant embodiments (e.g., 100a, 100b, 100c, 100d) is also herein termed a "coupling system 200" as in a system of couplers 100.

FIG. 2 shows some basic common elements of the inventive couplers 100 that make up the inventive coupling system 200. Each coupler 100 comprises at least two longitudinally extending tracks 102 that are joined at a fixed angle junction 118 to form a vertex 104 of a fixed angle A. Both the corner coupler 100a and the straight coupler 100b have a first track 102a and a second track 102b, the difference being that the fixed angle A at the vertex 104 is (has a magnitude/value of) ninety degrees for a "right angle" embodiment of the corner coupler 100a, whereas the fixed angle A at the vertex 104 of the straight coupler 100b is precisely one hundred eighty degrees. Obviously the corner coupler 100a could be made according to the invention with a non-right fixed angle A. In fact the inventive coupler 100 merely changes an arbitrary, non-limiting title (e.g., "corner", "straight") when the fixed angle A is varied within the scope of the invention. The tee coupler 100c and the cross coupler 100d add extra tracks 102: a third track 102c, and a third track 102c plus a fourth track 102d, respectively. The tee coupler 100c and the cross coupler 100d are shown with the same structure at the vertices 104 as for the corner coupler 100a, however the scope of the invention includes variations wherein one or more of the tracks 102 are essentially moved across the middle to join two opposed tracks (e.g., second and third tracks 102b and 102c) the same way that the first and second tracks 102a and 102b of the straight coupler 100b are joined at a fixed angle junction 118 that exhibits a fixed angle A of one hundred eighty degrees. The structure that would be changed will become evident in the disclosure hereinbelow, but is not given reference numbers in FIG. 2.

A best mode for the inventive coupling system 200 includes further structural details and elements of the inventive couplers 100, illustrated in FIGS. 3A, 3B, 4A and 4B using the example of a corner embodiment of the coupler 100. The best mode of the system 200 further includes the coupling method which is illustrated in FIG. 5 using the corner embodiment of the coupler 100. Another example with a straight embodiment of the coupler 100 will also be discussed with reference to FIGS. 6-8.

In FIG. 5 a first ruler arm 502 (being part of a first scale 500) and a second ruler arm 502' (being part of a second scale 500') are slidingly engaged in respective first and second tracks 102a and 102b of the coupler 100 to form a coupled scale 300 that is characterized by a scale joint 312 defined by the locus of a corner point 507 (see FIG. 1C) of a first ruler arm's end 506 touching a corner point 507 of a second ruler arm's end 506' at the fixed angle junction 118 of the coupler 100. The tracks 102 are structured to guide the sliding engagement in through open ends 116 and then to releasably hold the ruler arms 502 of the two scales 500 such that the scale joint 312 at the coupler's fixed angle junction 118 precisely duplicates the fixed angle A about the vertex 104 of the coupler 100. In this way the coupled scale 300 substantially duplicates the functions of a prior art scale 500 (while also expanding the overall size).

Referring especially to FIGS. 3A-4B, the coupler 100 comprises a longitudinally extending first track 102a having a lower surface 108; first and second laterally opposed parallel edge walls 110a and 110b, respectively, extending up from the lower surface 108 and spaced apart by a track width dimension W' that is suitable for slidingly engaging a first ruler arm's width W; a first open end 116a; and holding tabs 112 (more simply referred to as "tabs") that extend laterally inward from both edge walls 110 to define an (inside) upper surface 114 that is spaced above the lower surface 108 by a track height dimension T' that is suitable for slidingly engaging the first ruler arm's thickness T. Similarly, a longitudinally extending second track 102b has a lower surface 108; first and second laterally opposed parallel edge walls 110a and 110b, respectively, extending up from the lower surface 108 and spaced apart by a dimension W' suitable for slidingly engaging a second ruler arm's width W; a second open end 116b; and holding tabs 112 that extend laterally inward from both edge walls 110 to define an (inside) upper surface 114 that is spaced above the lower surface 108 by a track height dimension T' suitable for slidingly engaging the second ruler arm's thickness T. The first track 102a and the second track 102b are joined at a fixed angle junction 118 where the lower surfaces 108 of the first and second tracks 102a, 102b are co-planar; the upper surfaces 114 of the first and second tracks 102a, 102b are co-planar; and the first edge wall 110a of the first track 102a is joined to the first edge wall 110a of the second track to form a vertex of the fixed angle A.

By comparing FIGS. 2, 3A, and 5 it can be seen that the vertex 104 defines the fixed angle A relative to the inside corner of external wall surfaces of the coupler 100, and that the fixed angle junction 118 also defines the same fixed angle A relative to the corner formed by the (fixed angle) junction 118 of inside surfaces of the first and second track's first edge walls 110*a*. Since the ruler arm straightedges 510, 510' of the coupled scales 500, 500' are held parallel to, and engaged against, the first edge walls 110*a*, then the fixed angle junction 118 becomes a vertex for the same fixed angle A between the ruler arms 502, 502' of the coupled scales 500, 500'. It may be noticed that the forgoing discussion assumes that the outside surface of a track wall is parallel to the inside surface of the track edge wall 110, however this is not a limiting requirement, just a matter of convenience. It should be apparent that the point labeled 104 is irrelevant to the functioning of the invention, and all that matters is the inside surface of the track edge walls 110 and the fixed angle junction 118 where they join to form a vertex for the fixed angle A. Therefore, any reference to a "wall 110" (track wall, edge wall, side wall) in the specification and drawings of the present disclosure should be read as a reference to the inside surface of the referenced wall 110. For example, while the dimension W' may be described as a wall to wall track width, FIG. 4A shows that the track width W' is specifically a distance between inside surfaces of the track's two edge walls 110.

By saying that a scale (i.e., its ruler arm 502) is "slidingly engaged" in a track 102 of a coupler 100, we mean that the side edge walls 110, top surface 114 and bottom surface 108 inside the track 102 are close-fitting around the ruler arm 502—i.e., close enough to hold the arm 502 stably in place with a degree of accuracy sufficient for its intended use (e.g., as a forensic scale), but not so close that sliding of the arm 502 in the track 102 is unreasonably difficult. Given the foregoing explanation of the inventive concept, one of ordinary skill in the relevant arts should have no trouble determining actual dimension values and tolerances for a track width W' and a track height T' that will be suitable for slidably engaging a ruler arm having known dimensions for an arm width W and an arm thickness T. Said one of ordinary skill will also know how to utilize known material and shape variations to help achieve the performance requirements taught according to the invention as described and claimed herein.

FIGS. 4A and 4B illustrate the track bottom surface 108, the edge walls 110 and the tabs 112 that guide the scale arms 502 into the coupler 100. Each ruler arm 502 is held stably in place by the track 102 wherein the edge walls 110 rise up to the tabs 112 that wrap over the arm 502. The tabs 112, indeed the entire coupler 100 may be made from a transparent material such as clear plastic, so that scale markings 504 covered by a tab 112 can still be read. The ruler arm 502 of the scale 500 seats between the upper surface 114 and lower surface 108 of the track 102 as the ruler arm 502 is slidingly engaged with the track 102 of the coupler 100.

The tracks 102 as described so far are sufficient to assure arm-to-arm angular accuracy and same-plane orientation of two ruler arms 502 that are slidingly engaged in two tracks 102 of the coupler 100, but the user must exert some care if he wants to align (register) scale markings 504 of the two coupled scales 500 in order to maintain measurement accuracy of the scale markings 504 across the scale joint 312. For example, to make the coupled scale 300 illustrated in FIG. 5 duplicate the measurement accuracy of the right angle scale 500*a* as it is shown in FIG. 1A (i.e., 300 in FIG. 5 compared vs. 500*a* in FIG. 1), the zero mark (referenced as end mark 505 vs. 505*b*) of the first ruler arm (502 vs. 502*b*), and the zero mark (referenced as end mark 505' vs. 505*b*) of the second ruler arm (502' vs. 502*a*) must be registered such that they are aligned to intersect at the inside corner point (118 vs. unmarked) of the scale (300 vs. 500*a*).

In order to assist a user in registering zero marks 505 by accurate positioning of two ruler arms 502 in a coupler 100, an optional registration stop 106 is preferably positioned to define a track inner end (106) that is distal to the open end 116 of the track 102, thereby accurately positioning the end 506 of a suitably slidingly engaged ruler arm 502 for proper registration of scale markings 504 (preferably zero marks) of the coupled scale 300. Placement of the registration stop(s) 106 depends upon the assumed shape of the ruler arm end 506. Preferably the ruler arm ends 506 are square ends with coincident end marks 505. In this case, referring to FIG. 3A, the registration stop 106*a* of a first track 102*a* comprises a vertical wall extending up from the lower surface 108 of the first track 102*a* and is positioned such that the registration stop's wall 106*a* at the inner end of the first track 102*a* is aligned with the first edge wall 110*a* of the adjoined second track 102*b*. Similarly, the registration stop 106*b* of a second track 102*b* comprises a vertical wall extending up from the lower surface 108 of the second track 102*b* and is positioned such that the registration stop's wall 106*b* at the inner end of the second track 102*b* is aligned with the first edge wall 110*a* of the adjoined first track 102*a*.

A preferred example of the method of the inventive coupling system is now discussed mainly in terms of a corner coupler embodiment exemplary of the inventive couplers 100 of the coupling system 200. FIG. 5 is the primary illustration, but we also refer to the foregoing FIGS. 1-4B as needed.

As shown in FIG. 5, a first ruler arm 502 (being part of a first scale 500) has been slid through a first open end 116*a* of the coupler 100 into a first track 102*a* to be slidingly engaged by surrounding close-fitting components of the first track 102*a*; wherein the close-fitting track components include a lower surface 108, an upper surface 114 determined by overhanging tabs 112, and first and second side edge walls 110 that extend between the lower surface 108 and the upper surface 114. The first scale 500 has been pushed in sliding engagement until a (square) longitudinal end 506 of the first arm 502, and a coincident end mark 505 (here a zero mark) are engaged against a first registration stop 106*a* inside the coupler 100. The first registration stop 106*a* is positioned relative to a second track 102*b* such that the end mark 505 engaged against it is aligned with an inside corner called a fixed angle junction 118 where a first edge wall 110 of the first track 102*a* is joined to a first edge wall 110 of the second track 102*b* to form a vertex 118 of the fixed angle A. Because the sliding engagement of the first arm 520 in the first track 102*a* of the coupler 100 is close fitting, the first scale 500 cannot be significantly moved either vertically or laterally relative to the coupler 100, and it is difficult to move the first scale 500 longitudinally outward (due to friction). Also, because of the first registration stop 106*a* the first scale 500 cannot be moved longitudinally inward. Thus the first scale 500 is stably held in a removably fixed position relative to the coupler 100.

Further as shown in FIG. 5, a second ruler arm 502' (being part of a second scale 500') has been slid through a second open end 116*b* of the coupler 100 into a second track 102*b* to be slidingly engaged by surrounding close-fitting components of the second track 102*b*; wherein the close-fitting track components include a lower surface 108, an upper surface 114 determined by overhanging tabs 112, and first and second side edge walls 110 that extend between the lower surface 108 and the upper surface 114. The second scale 500' has been pushed in sliding engagement until a (square) longitudinal end 506' of the second arm 502', and a coincident end mark 505' (a zero mark) are engaged against a second registration stop 106b inside the coupler 100. The second registration stop 106b is positioned relative to the first track 102a such that the end mark 505' engaged against it is aligned with the inside corner (fixed angle junction 118) where a first edge wall 110 of the second track 102b is joined to a first edge wall 110 of the first track 102a. Because the sliding engagement of the second arm 520' in the second track 102b of the coupler 100 is close fitting, the second scale 500' cannot be significantly moved either vertically or laterally relative to the coupler 100, and it is difficult to move the second scale 500' longitudinally outward. Also, because of the second registration stop 106b the second scale 500' cannot be moved longitudinally inward. Thus the second scale 500' is stably held in a removably fixed position relative to the coupler 100.

Since both the first scale 500 and the second scale 500' are held in a removably fixed position relative to the coupler 100, and therefore relative to each other, the inventive coupling system/method 200 utilizing an inventive coupler 100 has transformed the first scale 500 and the second scale 500' into arms of a new forensic scale, a "coupled scale 300", that exhibits the same desired properties as a single prior art forensic scale 500—in this example a right angle scale 500a. The ninety degree fixed angle A that was built into the right angle (corner) coupler 100 has been translated to become a ninety degree fixed angle A between the arms 510, 510' of the coupled scale 300. The registration stops 106a, 106b plus suitably selected scale ruler arms 502, 502' have precisely positioned the scale markings 504, 504' respectively such that the zero/end marks 505, 505' are registered with each other to intersect at a single point scale joint 312 that coincides with the vertex of the coupled scale's arm-to-arm fixed angle A, thus creating a single zero/origin point for the multi-armed coupled scale 300. This assures measurement accuracy of scale markings 504, 504' across the scale joint 312, enabling a user of the coupled scale 300 to make accurate measurements in the two dimensional space encompassed by the coupled scale 300, just as he would with a prior art right angle scale 500a, except that the coupled scale 300 likely encompasses a larger or differently shaped area due to its combination of typically smaller prior art scales 500.

FIG. 4B illustrates a cross-section of the coupler 100 taken along the line 4B-4B that cuts across the tabs 112 and cutouts 120. Comparing this with the bottom view of FIG. 3B, where hidden portions of the edge walls 110 are indicated by dashed lines, illustrates a preferred manufacturing method embodied in the design of the coupler 100. Since plastic is a convenient and preferred material for making the couplers 100, an inexpensive molding method is desirable for parts like the corner embodiment of the coupler 100 that cannot be extruded due to its non-linear shape. The cutout 120 is an opening through the lower surface 108 (and an outside lower surface 122) that is at least as large an area as the tab 112, and is positioned directly below the tab 112. This greatly simplifies molding such that, for example, a two part mold with no moving parts can be used wherein the bottom mold half has a vertical post portion that extends upward from a mold floor (for the outside lower surface 122) along the edge wall 110 to stop at the level of the tab's underside which is the track's upper surface 114. For all other (non-tabbed) portions of the coupler 100, the top mold half would instead project downward as appropriate to the top of the edge walls 110 or down along the edge wall 110 to stop at the level of the track's lower surface 108. Although the straight embodiment 100b of the coupler 100 can be similarly molded as shown in FIG. 2, a simpler extrusion method is preferred, as illustrated in FIGS. 6-8 (further discussed hereinbelow).

Referring again to FIG. 2, it can be seen that the straight coupler 100b is essentially the same as a two-tracked coupler like the corner coupler 100a wherein the first and second tracks 102a, 102b have been rotated about their vertex 104 (or fixed angle junction 118) until the fixed angle A is at one hundred eighty degrees. As shown in FIG. 6, where the cross-sectional view has removed the tabs 112 for a more complete view of two scales 500, 500' that are coupled in a straight coupler 100, the fixed angle junction 118 of the first track edge wall(s) 110a is the same as the fixed angle junction 118 of the second track edge wall(s) 110b. In effect, the straight coupler 100 has two virtual tracks that are merged into a single track 102 that has two longitudinally opposed open ends 116, but is otherwise merged into a single first edge wall 110a, a single second edge wall 110b, a single planar lower surface 108, and a single planar upper surface 114 (the lower and upper surfaces 108, 114 being planar even if broken into separated portions by tabs 112 and cutouts 120, for example).

The coupled scale 300 shown in FIG. 6 is substantially equivalent to a straight scale like the straight scale 500b illustrated in FIG. 1B. A first ruler arm 502 (being part of a first scale 500) has been slid through a first open end 116 of the coupler 100 into a (virtual first) track 102 (upper portion of the merged first and second tracks) to be slidingly engaged by surrounding close-fitting components of the first track 102; wherein the close-fitting track components include a lower surface 108 (not visible in this view), an upper surface 114 determined by overhanging tabs 112 (not visible in this view), and first and second side edge walls 110a, 110b, respectively, that extend between the lower surface 108 and the upper surface 114. The first scale 500 has been pushed in sliding engagement until a (square) longitudinal end 506 of the first arm 502, and a coincident end mark 505 (here a five centimeter mark) are suitably located near the longitudinal middle of the coupler 100 thereby establishing a fixed angle junction 118 where a first edge wall 110a of the (virtual) first track 102 is joined to a first edge wall 110a of the (virtual) second track 102b to form a vertex 118 of the fixed angle A. Because the sliding engagement of the first arm 520 in the track 102 of the coupler 100 is close fitting, the first scale 500 cannot be significantly moved either vertically or laterally relative to the coupler 100, and it is difficult to move the first scale 500 longitudinally outward (due to friction). Thus the first scale 500 is stably held in a removably fixed position relative to the coupler 100.

Further as shown in FIG. 6, a second ruler arm 502' (being part of a second scale 500') has been slid through a second open end 116 of the coupler 100 into a (virtual second) track 102 (lower portion of the merged first and second tracks) to be slidingly engaged by surrounding close-fitting components of the second track 102; wherein the close-fitting track components include a lower surface 108 (not visible in this view), an upper surface 114 determined by overhanging tabs 112 (not visible in this view), and first and second side edge walls 110a, 110b, respectively, that extend between the lower surface 108 and the upper surface 114. The second scale 500' has been pushed in sliding engagement until a (square) longitudinal end 506' of the second arm 502', and a coincident end mark 505' (here a zero mark) are engaged against the longitudinal end 506 with coincident end mark 505 of the first arm 502 at the fixed angle junction 118. Because the sliding engagement of the second arm 520' in the track 102 of the coupler 100 is close fitting, the second scale 500' cannot be significantly moved either vertically or laterally relative to the coupler 100, and it is difficult to move the second scale 500 longitudinally outward (due to friction). Thus the second scale 500' is stably held in a removably fixed position relative to the coupler 100, and thus also relative to the first scale 500.

Thus, just as with the right angle scale/corner coupler example, the inventive coupling system/method 200 utilizing a straight embodiment of the inventive coupler 100 has transformed the first scale 500 and the second scale 500' into arms of a new forensic scale, a "coupled scale" 300, that exhibits the same desired properties as a single prior art forensic scale 500—in this example a straight scale 500b. Since the ruler edges 510, 510' are held in alignment between the close fitting first and second coupler edge walls 110a, 110b, the one hundred eighty degree fixed angle A that was built into the straight coupler 100 has been translated to become a one hundred eighty degree fixed angle A between the arms 510, 510' of the coupled scale 300. By abutting longitudinal ends 506, 506' of suitably selected scale ruler arms 502, 502' the scale markings 504, 504' respectively are aligned such that the end marks 505, 505' are registered with each other to intersect at a single scale joint 312 that coincides with the vertex of the coupled scale's arm-to-arm fixed angle A, thus creating a single zero/origin point for the multi-armed coupled scale 300. This assures measurement accuracy of scale markings 504, 504' across the scale joint 312, enabling a user of the coupled scale 300 to make accurate measurements in the space encompassed by the coupled scale 300, just as he would with a prior art straight scale 500b, except that the coupled scale 300 likely encompasses a larger or differently shaped area due to its combination of typically smaller prior art scales 500 (which could be right angle scales that are now coupled to form, for example, a U-shaped scale). Obviously, what is being called a zero/origin point of the scale markings at the scale joint 312, is in effect a single scale mark 504 that is spaced relative to adjacent scale markings 504, 504' precisely the same as the other scale markings, regardless of how they may be labeled with numbers printed on the scale(s) 500, 500'. Thus accurate distance measurements can be made using a portion of the straight coupled scale 300 even if the portion includes the scale joint 312 in its span. Of course, while assuring a precisely linear coupled scale 300, the straight embodiment of the coupler 100 can only assure such measurement accuracy across the scale joint 312 when the user selects suitable first and second prior art scales 500, 500', wherein suitability in this case means that at least the scale arm ends 506, 506' that are being abutted are shaped and marked in a way that positions one's end mark 505 where it will abut against the other one's end mark 505'. Of course this is most likely when the abutting ruler arm ends 506, 506' are square ends.

FIG. 7 illustrates two straight scales (e.g., 500b of FIG. 2) as a coupled scale 300 using a straight embodiment of the coupler 100. A first scale 500 is slidingly engaged through a first open end 116 of the coupler 100, and a second scale 500' is slidingly engaged through a second open end 116 of the coupler 100, such that ruler arms 502, 502' of the scales 500, 500' meet to form a scale joint 312 near the middle of the coupler 100; thereby slidingly engaging the first and second scale ruler arms 502, 502' in the track(s) 102 of the coupler 100. A first edge wall 110a topped by a first tab 112a and a second edge wall 110b topped by a second tab 112b combine with the lower surface 108 (not visible in this view) to guide the scales 500, 500' into place and provide stability when the scale arms 502, 502' are slidingly engaged in the coupler 100 by stably but removably holding the ruler edges 510, 510' in alignment between the close fitting first and second coupler edge walls 110a, 110b, and the ruler arms between the lower surface 108 and upper surface 114 (not visible in this view) of the coupler 100.

As for the scales shown in FIG. 6, the scales 500, 500' in FIG. 7 are held by the coupler 100 in precise linear alignment, however because of a rounded shape for the longitudinal arm ends 506, 506' of the user-selected scales 500, 500', even though the ends 506, 506' are abutted measurement accuracy across the scale joint 312 will depend upon placement of the end-most scale marking 504 on each scale arm 502. Scale markings 504 are not shown in this illustration, but some prior art scales 500 are known to have rounded ends 506 (not a "square end") plus scale markings in a sequence that ends short of the arm end 506. Obviously a scale such as that would not be a "suitable" selection for use with a coupler 100 in making a coupled scale 300 that has measurement accuracy across the scale joint 312 in addition to arm-to-arm angular accuracy.

Since the straight embodiment of the coupler 100 is linear in a way that can be extruded, the tabs 112 are conveniently made the same longitudinal length as the rest of the track 102, as shown in FIG. 7. For the same reason, the extruded straight coupler 100 may alternatively be made as shown in FIG. 8, which illustrates a straight coupler 100 with edge walls 110 that rise up to continuous holding tabs 112 without a break in the upper surface 114. Thus the first tab 112a extends all the way from the first edge wall 110a to the second edge wall 110b thereby merging with the second tab 112b to form a single continuous tab 112 defining a continuous planar upper surface 114 for the track 102 of the coupler 100. Although this variation uses more material to form the coupler than one having separated tabs 112, it may be desirable for other reasons, such as, for example, providing scale markings on the coupler's top surface.

Blood and other bodily fluids can be made more visible to eye or camera when they are viewed under UV (ultraviolet) illumination; in which case scale markings that fluoresce under at least partial UV lighting can be helpful in making measurements. FIGS. 9A and 9B illustrate an advantageous enhancement of the inventive couplers 100 wherein a surface of the coupler 100, for example the outside lower surface 122, has fluorescent scale markings 124 printed thereon. In FIG. 9a a cross embodiment of the coupler 100 is shown with two examples of fluorescent scale markings 124: on three of the coupler tracks 102a, 102b, 102d there are relatively thick/heavy lines at 10 mm and 20 mm; the thick lines (e.g., 1 mm wide) maximizing visibility as well as potentially providing a secondary 1 mm distance reference. On the fourth track 102c finer lines are used to identify 1 mm and 5 mm scale marking increments. FIG. 9B illustrates fluorescent scale markings 124 applied to the outside bottom surface 122 of a straight embodiment of the coupler 100. The coupler scale markings 124 are advantageously straight lateral lines extending at least partially across a track 102 of a coupler 100. Obviously they may be printed on any surface of the coupler and may or may not fluoresce. For example, but not limited to such, coupler scale markings 124 may be placed on small portions of tabs 112, on edge walls 110, and on extensions of a coupler body outside of the track 102 holding a scale arm 502 (e.g., on the outside corner at the upper left of the coupler 100 as shown in FIG. 5, no reference number). Other surfaces of a coupler 100 (e.g., the track's lower surface 108 or upper surface 114) are made usable for coupler scale markings 124 when the coupler 100 is made from a transparent material like clear plastic.

Thus the inventive coupling system comprises a collection of inventive couplers (couplings, connectors) and a corresponding coupling method that removably connect existing commercially available forensic scales (without modification) to create a coupled scale, wherein a ruler arm of each scale is slidingly engaged in a track of the coupler that provides and maintains arm-to-arm angular accuracy for scales coupled in a fixed angle joint. The angular accuracy includes co-linearity of one hundred eighty degree joined straightedge ruler arms in a planar configuration that linearly extends a scale's ruler arm. In another embodiment a corner coupler adds a ruler arm at a fixed right angle of ninety degrees. The coupling system also comprises an inventive method for holding the forensic scales stably in place, wherein a track for holding a ruler arm includes a lower surface; two laterally opposed parallel edge walls extending up from the lower surface and spaced apart by a dimension W' suitable for slidingly engaging a ruler arm of width W; an open end; and tabs that extend laterally inward from both edge walls to define an upper surface spaced above the lower surface by a dimension T' suitable for slidingly engaging the ruler arm's thickness T. Thus, by using the inventive coupling system, a user is able to assemble a custom coupled scale comprising any desired planar configuration of ruler arms as needed to accurately photo-document exact dimensions and relative locations of evidence that is scattered over a larger and/or more oddly shaped area than can be covered by a single standard scale.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention as claimed are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A coupler for removably coupling together unmodified forensic scales to form a coupled scale with at least two of the unmodified forensic scales being coupled as straight ruler arms extending from a scale joint that defines a fixed angle A about a vertex therebetween, and wherein the coupler holds the coupled scales in a way that maintains an accurate fixed angle A at the scale joint, and maintains measurement accuracy of scale markings across the scale joint; the coupler comprising:
at least two tracks, each track comprising:
a longitudinally extending lower surface; two laterally opposed parallel edge walls extending up from the lower surface and spaced apart by a track width W' that closely fits a standard forensic scale width W; holding tabs that extend laterally inward from both edge walls to define an upper surface spaced above the lower surface by a track height T' that closely fits a standard forensic scale thickness T; and an open end longitudinally distal to a track inner end defined by a registration stop wall; and the coupler further comprising:
a fixed angle junction where a first and a second one of the tracks are joined such that:
the lower surfaces of the tracks are co-planar; an edge wall of the first track and an edge wall of the second track are aligned to define a vertex of the fixed angle A; and at the vertex the registration stop at the inner end of each of the first and second tracks is aligned with an edge wall of the other one of the tracks.

2. The coupler of claim 1, wherein:
the holding tabs extend all the way from the first edge wall to the second edge wall and merge to form a continuous planar upper surface.

3. The coupler of claim 1 wherein:
the fixed angle A is ninety degrees such that, when the first and second scale ruler arms are suitably slidingly engaged with respective first and second tracks, the scale joint is defined by the locus of a corner point of the first ruler arm end touching a corner point of the second ruler arm end at the fixed angle junction of the coupler, thereby forming the vertex of the fixed angle A.

4. The coupler of claim 3 wherein:
two, three, or four of the tracks are joined at ninety degree fixed angle two-track junctions to form one, two, or four right angle vertices, respectively; for a corner coupler, a tee coupler, or a cross coupler, respectively.

5. The coupler of claim 1, further comprising:
cutouts passing through the lower surface of the tracks, a one of the cutouts being located vertically below each one of the holding tabs such that each cutout has an open area that encompasses the entire track upper surface defined by the respective holding tab;
thereby simplifying coupler manufacturing.

6. The coupler of claim 1, wherein:
a plurality of couplers are provided as a scale coupling system.

7. The coupler of claim 6, wherein the scale coupling system comprises:
a combination of two or more couplers selected from the group consisting of straight couplers, corner couplers, tee couplers, and cross couplers; wherein:
a straight coupler has two tracks joined at a fixed angle of one hundred eighty degrees;
a corner coupler has two tracks joined at a fixed angle of ninety degrees;
a tee coupler has three tracks, two being joined at a fixed angle of ninety degrees to a third track, and also joined at a fixed angle of one hundred eighty degrees to each other; and
a cross coupler has four tracks joined at four fixed angles of ninety degrees.

8. The coupler of claim 1 wherein
the coupler is transparent, at least where it covers the scale markings on a slidingly engaged scale ruler arm.

9. The coupler of claim 1 further comprising:
scale marking lines on a surface of the coupler.

10. The coupler of claim 9, wherein the scale marking lines:
are on an outside lower surface of the coupler.

11. The coupler of claim 9, wherein the scale marking lines:
fluoresce under ultraviolet lighting.

12. The coupler of claim 9, wherein the scale marking lines are straight lateral lines extending at least partially across the coupler; and one or more of the scale marking lines have a line width of about 1 mm.

13. A method for removably coupling together unmodified forensic scales to form at least a two arm coupled scale with two of the unmodified scales being coupled at a scale joint defining a fixed angle A about a vertex therebetween, and wherein measurement accuracy of scale markings is maintained across the scale joint, the method comprising the steps of:
selecting a first and a second forensic scale, each having a standardized width W and thickness T, and a series of scale markings extending longitudinally at regular measurement intervals relative to an end mark at a longitudinal end of the scale;
establishing an accurately held fixed angle A by providing a coupler that has at least two coplanar tracks wherein a first track is fixed at the fixed angle A relative to a second track; and wherein the first and second tracks each have lower and upper surfaces spaced apart by a track height T' that closely fits the standardized thickness T, and have opposed side edge walls spaced apart by a track width W' that closely fits the standardized width W, thereby establishing a sliding friction fit in the tracks for removably holding each scale in a fixed position when it is engaged in each of the tracks;

slidingly engaging a first scale's arm in the first track, and slidingly engaging a second scale's arm in the second track, maintaining measurement accuracy of scale markings across the scale joint by causing said slidingly engaged first and second scales to form a scale joint wherein the first arm's end mark intersects the second arm's end mark at the vertex of the fixed angle A; and providing a registration stop at an inside end of each track, and slidingly engaging the first scale's arm in the first track until it is stopped at the first track's registration stop, and slidingly engaging the second scale's arm in the second track until it is stopped at the second track's registration stop.

14. The method of claim 13, further comprising the step of: selecting the first and second scales for having a square ruler arm end mark being one of the scale markings that is positioned precisely at the edge of the square ruler arm end; thereby enabling the regular measurement intervals of the scale markings to continue across the scale joint.

\* \* \* \* \*